United States Patent [19]
Boutin

[11] Patent Number: 5,791,718
[45] Date of Patent: Aug. 11, 1998

[54] COVER ASSEMBLY FOR A MOTORCYCLE

[76] Inventor: Gerard Boutin, 17 A Bruce Street, Leamington, Ontario, Canada, N8H 4C4

[21] Appl. No.: 680,172

[22] Filed: Jul. 15, 1996

[51] Int. Cl.[6] .................................................. B62J 17/06
[52] U.S. Cl. .............................................. 296/78.1; 296/136
[58] Field of Search ............................ 296/136, 78.1, 296/107; 280/DIG. 5

[56] References Cited

U.S. PATENT DOCUMENTS

| | | | |
|---|---|---|---|
| 3,284,130 | 11/1966 | Michael | 296/78.1 |
| 4,336,964 | 6/1982 | Pivar | 296/78 R |
| 5,058,943 | 10/1991 | Louderback | 296/107 |
| 5,072,987 | 12/1991 | Allen | 296/107 |
| 5,217,275 | 6/1993 | Ridge | 296/77.1 |
| 5,240,305 | 8/1993 | Trethewey | 296/136 |
| 5,343,915 | 9/1994 | Newsome | 150/166 |
| 5,458,390 | 10/1995 | Gilbert | 296/78.1 |
| 5,588,690 | 12/1996 | Showalter | 296/77.1 |

FOREIGN PATENT DOCUMENTS

| | | | |
|---|---|---|---|
| 472924 | 7/1952 | Italy | 296/78.1 |
| 552965 | 12/1956 | Italy | 296/78.1 |

*Primary Examiner*—Gary C. Hoge
*Attorney, Agent, or Firm*—Howard & Howard

[57] ABSTRACT

A removable cover assembly for attachment to a motorcycle includes a windshield frame fixedly secured to the outside of the motorcycle windshield. A pair of rigid frame members include a first portion extending longitudinally in a horizontal plane from the windshield frame to a cross frame member. A second portion extends in a vertical plane from the cross frame member to a bracket member for attachment to the rear structure of the motorcycle. A flexible transparent cover panel includes a top section covering the first portion and a rear section covering the second portion of the frame members. The cover panel includes a pair of side sections extending downwardly from the top section for attachment to the sides of the motorcycle. Finally, each of the side sections includes an opening for entry and exit onto the motorcycle.

8 Claims, 4 Drawing Sheets

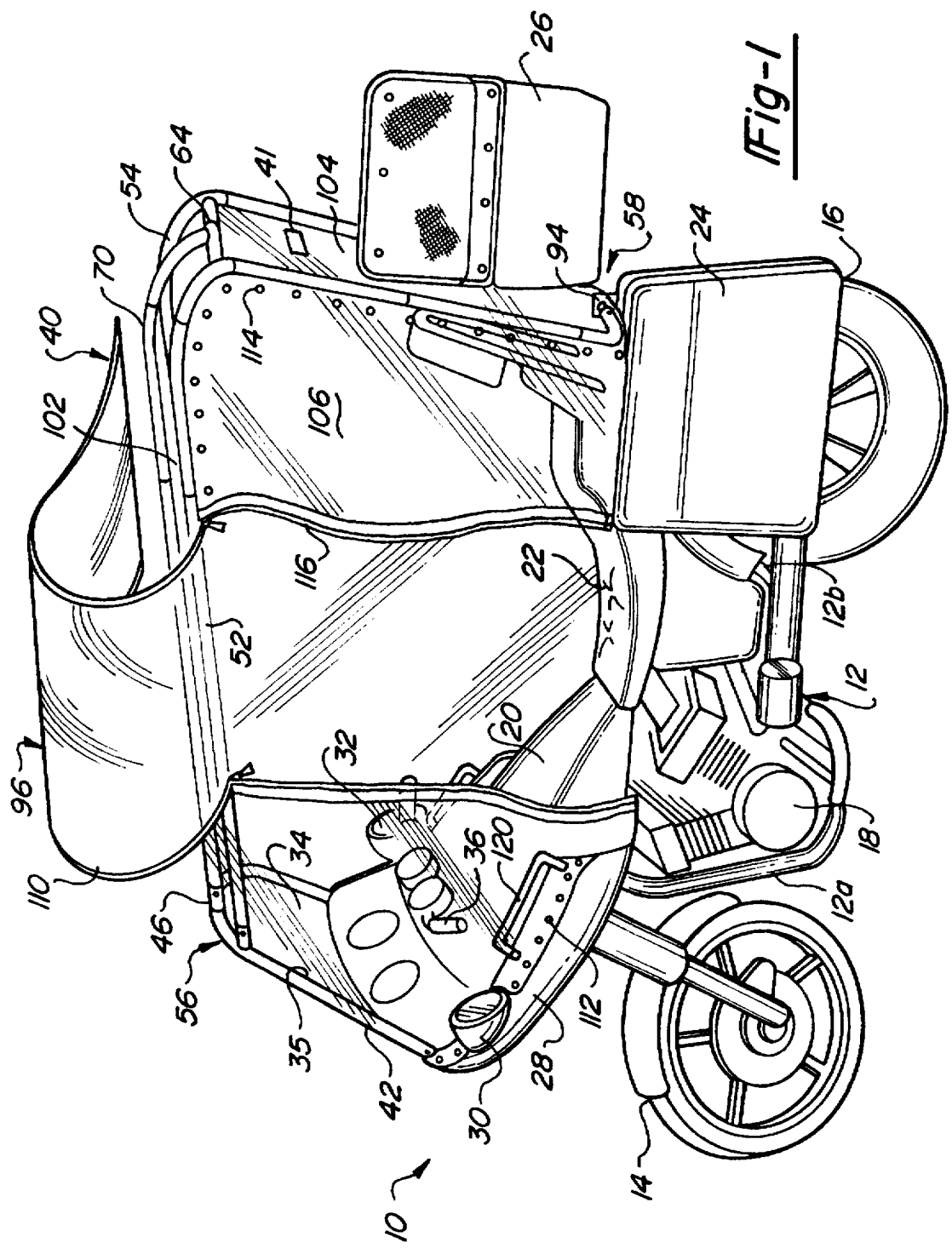

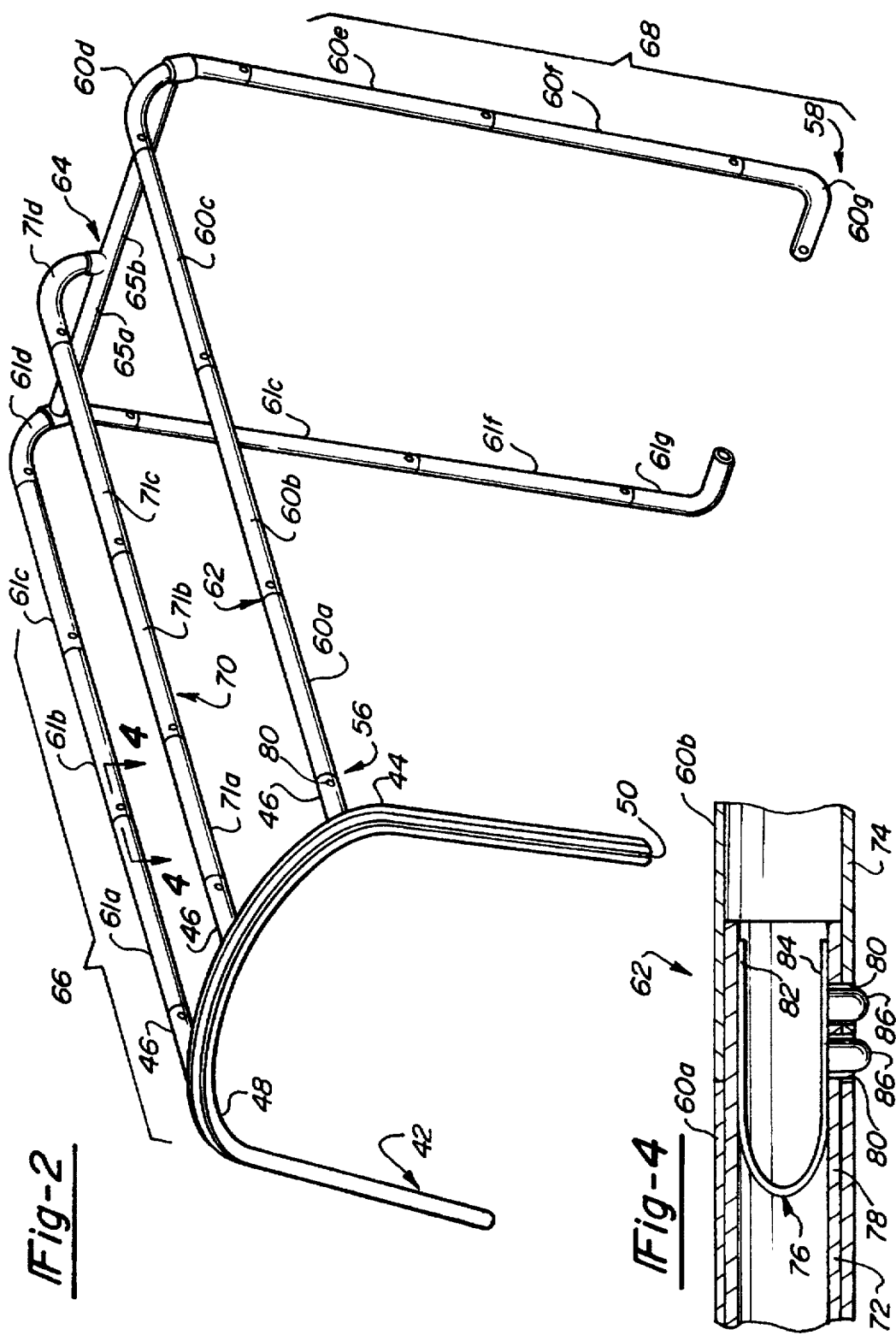

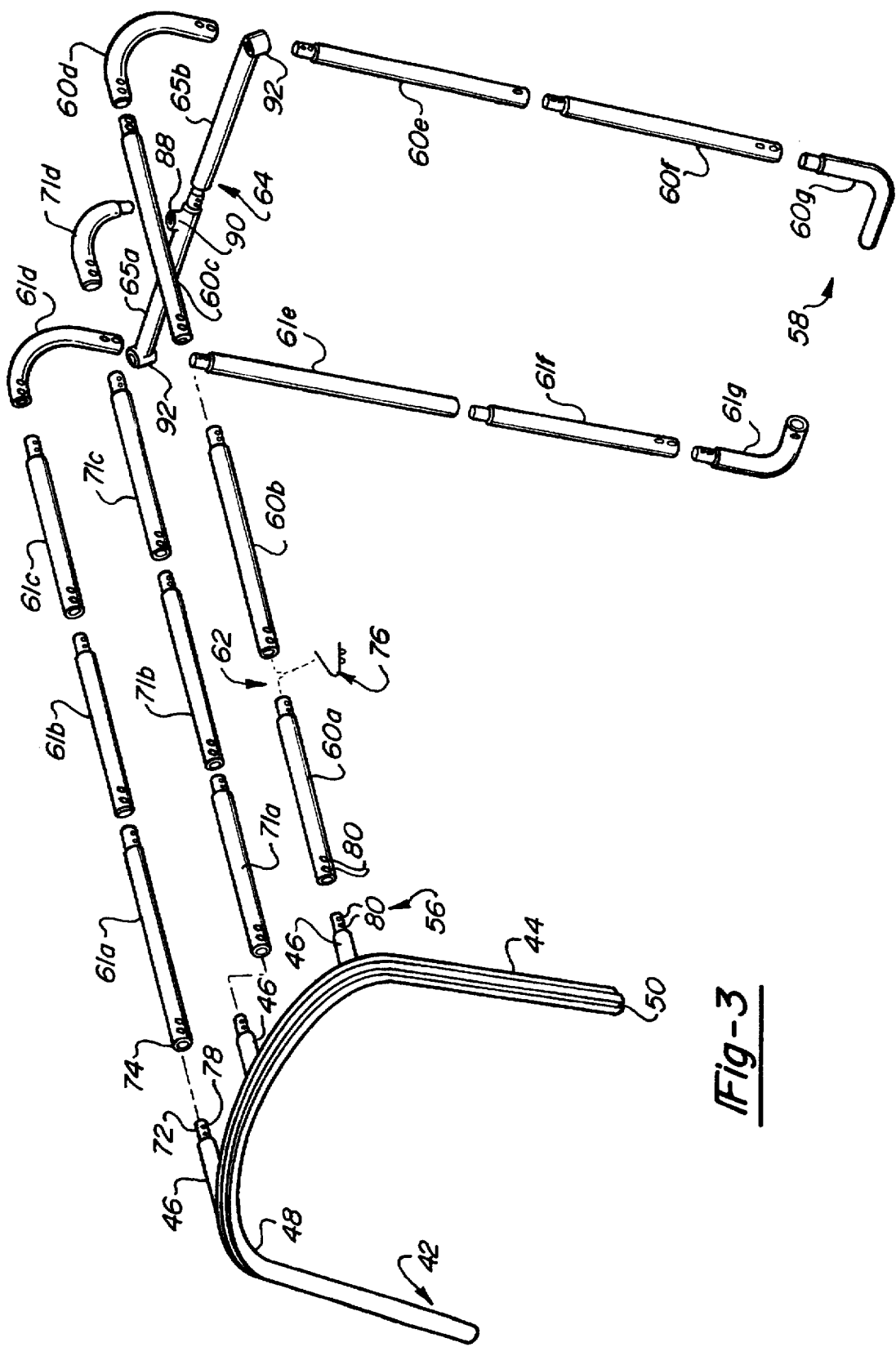

COVER ASSEMBLY FOR A MOTORCYCLE

TECHNICAL FIELD

The subject invention relates generally to a removable cover assembly for a motorcycle. More particularly, the subject invention relates to a removable cover assembly including a rigid frame assembly and a flexible transparent cover panel which may be attached to a motorcycle to protect the occupant from the elements of the weather.

BACKGROUND OF THE INVENTION

By way of background, the operators and passengers of motorcycles have long dealt with the need for protection from the element of weather, such as rain, wind, snow and cold climates. The operators and passengers often resort to wearing heavy and expensive cold weather or rain gear, or even forego riding their motorcycle.

Various cover assemblies have been developed having rigid frame structures for attachment to the motorcycle and cover panels attached to the frame structures for covering the operator and passengers of the motorcycle. However, these cover assemblies are not practical, are often difficult to assemble and would not allow proper operation of the motorcycle and would not allow easy access for the operator and passengers to the motorcycle.

For example, U.S. Pat. Nos. 3,284,130 to Michael and 4,681,362 to Taylor disclose cover assemblies for attachment to motorcycles. However, both of these cover assemblies restrict the full use of the motorcycle. Also, the cover assemblies do not protect the sides of the occupants on the motorcycle and are generally one piece construction.

It remains desirable to provide a removable cover assembly for attachment to a motorcycle which includes a plurality of easily connectable frame members for attachment to the front and rear of the motorcycle outside of any interference with the ingress and egress of the occupants of the motorcycle. Further, it remains desirable to provide a cover assembly which is non-obtrusive to the visibility and operation of the motorcycle.

SUMMARY OF THE INVENTION

The inventive removable cover assembly for attachment to the windshield and rear structure of a motorcycle comprises a windshield frame for attachment to the windshield of the motorcycle. A pair of rigid frame members extend longitudinally between first and second ends and include a first portion extending in a generally horizontal plane from the first end for attachment to the windshield frame and a second portion extending in a generally vertical plane from the first portion to the second end for attachment to the rear structure of the motorcycle. The first and second portions of the frame members include a plurality of elongated tubular sections having a connector at each opposing end for attachment to another one of the tubular sections.

A flexible and partially transparent cover panel overlays the frame members between the first and second ends and includes a front edge for engagement with the windshield frame and a rear edge for attachment to the second end of the frame members adjacent the rear structure of the motorcycle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a motorcycle including a removable cover assembly according to the subject invention;

FIG. 2 is a perspective view of the detachable frame members of the removable cover assembly;

FIG. 3 is an exploded view of the tubular sections for interconnecting the frame members of FIG. 2;

FIG. 4 is a cross-sectional view along line 4—4 of FIG. 2 of the connector for attachment between a pair of the tubular sections of the frame members;

DETAILED DESCRIPTION OF THE PREFERRED EMBODIMENT

Figure 5:
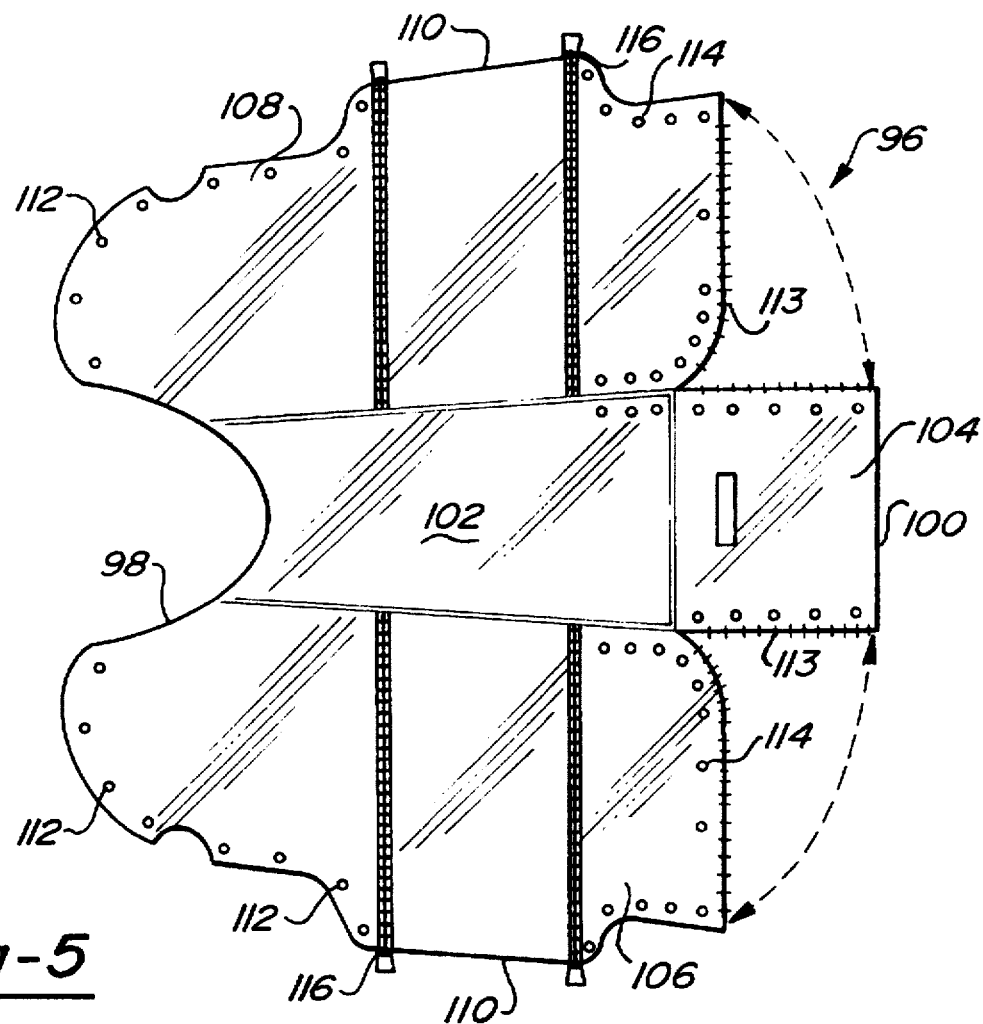
FIG. 5 is a top view of the cover panel for overlaying the frame members.
Figure 6:
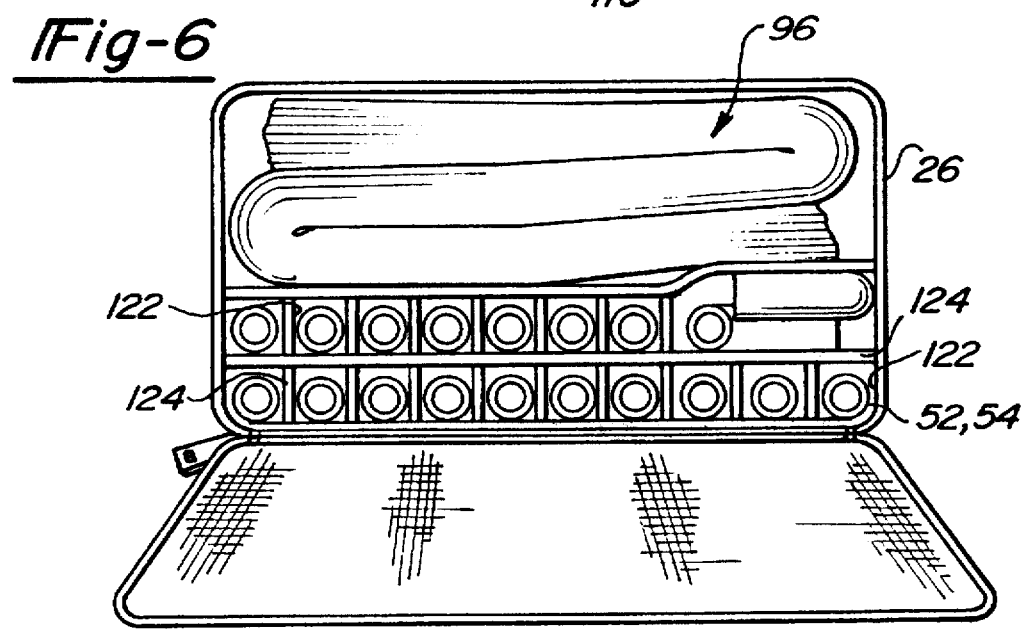
FIG. 6 is a side view of a rear storage compartment for storing the tubular sections of the frame members and the cover panel in individual compartments.

Referring to the Figures wherein like numerals indicate like or corresponding parts throughout the several views, FIG. 1 discloses a motorcycle generally indicated at 10 and including a main support frame 12 having a front support structure 12a and a rear support structure 12b. A front wheel and fender assembly 14 and rear wheel and fender assembly 16 are attached to and supported by the front support structure 12a and rear support structure 12b, respectively. The motorcycle further includes an engine 18 supported by the support frame 12 for driving the rear wheel assembly 16. A fuel tank 20 and a saddle-type seat 22 are secured to the support frame 12 between the front 14 and rear 16 wheel assemblies. The motorcycle 10 may further include, as shown in the preferred embodiment of FIG. 1, a pair of opposing side saddle bags 24 for use as storage compartments supported by the rear support structure 12b, a rear storage compartment 26 supported above the rear wheel assembly 16 and a front wind guard structure 28 mounted to the front support structure 12a above the front wheel assembly 14. The front wind guard 28 supports a pair of opposing side rear view mirrors 30, 32 and a generally vertically extending windshield 34 having a peripheral edge 35. A pair of handle bars 36 extend between the front wind guard 28 and the fuel tank 20 and attach to the front wheel assembly 14 for steering the motorcycle 10.

The subject invention includes a removable cover assembly as generally shown at 40 for attachment to the windshield 34 and rear structure of the motorcycle 10. It should be appreciated that the rear structure may include the side saddle bags 24, the rear storage compartment 26, the rear wheel assembly 16 or the rear support structure 12b of the motorcycle frame 12.

Referring to FIGS. 1 and 2, the removable cover assembly 40 comprises a generally U-shaped windshield frame 42 for attachment to the windshield 34 of the motorcycle 10. The windshield frame 42 includes a U-shaped support plate 44 having a thin rigid plate of metal or plastic composite extending between first and second ends adjacent opposing sides of the front wind guard 28 where the windshield 34 attaches to the wind guard 28. The support plate 44 is attached to the front or outer side of the windshield 34 along the peripheral edge 35 by means of screws, bolts or other fasteners. The support plate 44 also includes a plurality of tubular frame attachment extensions 46 extending rearwardly from the plate 44 toward the rear of the motorcycle 10. A portion of the support plate 44 extends partially above the top edge of the windshield 34 to allow the extensions 46 to extend over the top edge of the windshield 34.

The windshield frame 42 further includes a U-shaped cover tube 48 fixedly secured by welds or fasteners in overlapping relationship to the support plate 44. More specifically, the cover tube 48 is fixedly secured to the front or outer surface of the flat support plate 44 extending between the first and second ends thereof on the exterior of the windshield 34. The cover tube 48 is generally a hollow tubular structure of metal, carbon, plastic or other rigid substrate and includes a tube wall along the peripheral surface of the cover tube 48. A slot 50 passes through the tube wall and extends between opposing ends of the cover tube 48.

The removable cover assembly 40 further includes a pair of rigid frame members 52,54 extending longitudinally between first 56 and second 58 ends. The first ends 56 are adapted for attachment to the windshield frame 42 and the second ends 58 are adapted for attachment to the rear structure of the motorcycle 10. Each of the frame members 52,54 includes a plurality of elongated tubular sections 60a–g, 61a–g having a connector 62 at each opposing end for attachment to another one of the tubular sections 60a–g, 61a–g.

A cross frame member 64 comprises a plurality of similar tubular sections 65a,65b extending transverse to the longitudinal frame members 52,54 for interconnecting the frame members 52,54 in spaced apart parallel relation.

Each of the frame members 52,54 includes a first portion 66 made up of several interconnected tubular sections 60a–d,61a–d extending in a generally horizontal plane from the windshield frame 42 to the cross frame member 64 and a second portion 68 of interconnected tubular sections 60e–g,61e–g extending in a generally vertical plane from the cross frame member 64 to the rear structure of the motorcycle 10.

The removable cover assembly 40 further includes a center frame member 70 comprising a plurality of interconnected tubular sections 71a–d and extending longitudinally parallel to and between the pair of frame members 52,54 from the windshield frame 42 to the cross frame member 64.

Referring to FIG. 3, the tubular sections 60a–g,61a–g, 71a–d, and 65a,65b, which form the pair of frame members 52,54, the center frame 70 and the cross frame 64, are shown disconnected from the other sections which form the frames 52,54,70,64. The tubular sections 60a–d of frame member 52, sections 61a–d of frame member 54 and sections 71a–d of center frame member 70 include the same dimensions and therefore are readily interchangeable. Similarly, the tubular sections 60e–g and 61e–g are also interchangeable. Furthermore, each of the tubular sections forming the frames 52,54,64,70 include one of the connectors 62 therebetween. Therefore, only one of the connectors will be described hereinbelow.

Referring specifically to one of the connectors 62 between the tubular sections 60a,60b, as shown in FIGS. 3 and 4, the connector 62 includes a male portion 72 for insertion into a female portion 74 and secured together by a locking mechanism 76. Each of the tubular sections 60a,60b includes a tube wall forming a cylindrical cross-section having a predetermined diameter. The male portion 72 includes a cylindrical extension 78 protruding longitudinally from one end of the tubular section 60a and having a diameter less than the diameter of the remaining portion of the tubular section 60a. The opposing end of the tubular section 60b defines the female portion 74. The male portion 72 is slidably received into the open end of the female portion 74 until the end of the female portion 74 contacts the abutment wall between the smaller diameter male portion 72 and the tubular section 60a. Each of the male 72 and female 74 portions include a side opening 80 extending through the tube wall which align in overlapping relationship when the male portion 72 is fully inserted into the female portion 74. The locking mechanism 76 includes a generally U-shaped spring clip having a pair of legs 82,84 for engaging the opposing inner surfaces of the tube wall when seated inside the extension 78 of the male portion 72 of the tubular section 60a. One of the legs 84 of the spring clip 76 includes a pair of upstanding tab members 86 to be received through the openings 80 in the male 72 and female 74 portions to lock the portions 72,74 together. It should be appreciated that the spring clip 76 may include one or more tab members 86 on the same or opposing legs 82,84.

The cross frame 64 includes a pair of transversely extending tubular sections 65a,65b also having a connector 62 therebetween. One of the tubular sections 65a includes an upstanding female extension 88 having an opening 90 in the tube wall for receiving the male portion 72 of the curved or bent tubular section 71d of the center frame 70. The ends of each of the tubular sections 65a,65b opposite the upstanding extension 88 include a cylindrical collar 92 for receiving the curved tubular section 60d,61d of the respective frame members 52,54.

Still further, the second end 58 of the pair of frame members 52,54 includes a generally L-shaped end connector 60g,61g having a male portion 72 for receiving the female portion 74 of the respective tubular sections 60f,61f and an inwardly extending female portion 74 for attachment to a mounting bracket 94 on the rear structure of the motorcycle 10. In the preferred embodiment, the mounting brackets 94 are securely attached to the side saddle bags 24 of the motorcycle 10.

Referring to FIGS. 1 and 5, the removable cover assembly 40 also includes a flexible and at least partially transparent cover panel 96 for overlaying the frame members 52,54 between the first 56 and second ends 58. The cover panel 96 includes a front edge 98 for engagement with the windshield frame 42 and a rear edge 100 for attachment to the second end 58 of the frame members 52,54 adjacent the rear structure of the motorcycle 10. The front edge 98 conforms to a shape generally similar to the U-shaped cover tube 48 and is received and secured in the slot 50 in the cover tube 48.

The cover panel 96 includes a top section 102 covering the center frame 70 and the first portion 66 of the pair of frame members 52,54 between the front edge 98 and the cross frame 64 and a rear section 104 covering the second portion 68 of the pair of frame members 52,54 between the cross frame 64 and the rear edge 100. A pair of side sections 106,108 extend downwardly from the top section 102 from opposing sides of the pair of frame members 52,54 between the front edge 98 and the rear edge 100. Each of the side sections 106,108 of the cover panel 96 include an opening section 110 at least partially detachable from each of the side sections 106,108 between the front 98 and rear 100 edges.

An opening 41 allows air into the enclosure to prevent fogging. The location and shape of the opening 41 may vary.

A plurality of fasteners 112 including male and female buttons or snaps secure at least a portion of the side sections 106,108 of the cover panel 96 to the motorcycle 10. More specifically, as shown in FIG. 1 and 5, the fasteners 112 attach the front portion of the side sections 106,108 forward of the openings 110 to the opposing sides of the wind guard structure 28 between the side rear view mirrors 30,32 and the handle bars 36. Therefore, the side sections 106,108 of the cover panel 96 do not interfere with the operators view through the side rear view mirrors 36.

A second plurality of fasteners 114 also including buttons or snaps attach a portion of the side sections 106,108 to the top section 102 and the rear section 104 of the cover panel 96. In other words, the fasteners 114 attach or connect the side sections 106,108 to the top section 102 by wrapping or extending the cover panel 96 around the end of the first portion 66 of the frame members 52,54 adjacent the cross frame 64. Also, the fasteners 114 similarly attach the side sections 106,108 to the rear section 104 by wrapping around the second portion 68 of the frame members 52,54. Still further, the fasteners 114 attach the bottom of the side sections 106,108 to the top and front sides of the saddle bags 24. A plurality of threaded stitches 113 also fixedly secure the rear edge of the side sections 106,108 to the side edges of the rear section 104 to act as a primary attachment of the cover sections 106,108 to 104 and prevent the wind from removing the cover assembly from the frame.

Finally, a pair of closure members 116 including zippers selectively close the opening sections 110 of the side cover panels along the respective front and rear side sections 106,108. Each of the closure members 116 allow the opening sections 110 to be partially detached from the front and rear side sections 106,108 and pivot about a hinge with the top section 102 to access the motorcycle 10.

As shown in FIG. 1, a spacing bar 120 having a rigid generally U-shaped configuration is fixedly secured to each opposing side of the wind guard structure 28 and extends rearwardly and outwardly therefrom for spacing the side sections 106,108 of the cover panel 96 away from the handle bars 36 to prevent interference of the handle bars 36 with the cover 96 in the steering of the motorcycle 10.

Finally, the rear storage compartment 26 mounted to rear wheel assembly 16 includes a plurality of storage openings 122 divided by compartment walls 124 for individually storing each of the tubular sections 60a–g,61a–g,71a–d,65a, 65b of the frame members 52,54, the cross frame 64, the center frame 70 and the cover panel 96 and prevent contact therebetween. The storage compartment 26 may be flexible or rigid and includes a cover or door for closing the compartment and storing the cover assembly 40.

The removable attachment of the frame members 52,54, center frame 70 and cross frame 64 between the windshield frame 42 and the rear structure of the motorcycle 10 eliminates any interference of a rigid cover assembly structure with the seating and operating areas of the motorcycle and thus allow easy and non-obtrusive entry and exit to the motorcycle. Further, the opposing side opening sections 110 in the cover panel 96 allow access to either side of the motorcycle without removing the entire cover assembly 40.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A removable cover and motorcycle assembly, said assembly comprising:

a motorcycle having a support frame having a front support structure and a rear support structure, a front and rear wheel assembly supported by said frame, an engine for driving said rear wheel assembly, a saddle type seat, a wind guard structure mounted to said front support structure above said front wheel assembly and supporting an upwardly extending windshield and an opposing pair of rear view mirrors, and a pair of handle bars operatively connected to said front wheel assembly for steering said motorcycle; a windshield frame fixedly secured to said windshield; at least a pair of rigid frame members extending longitudinally between first and second ends, said frame members including a first portion extending in a generally horizontal plane from said first end removably attached to said windshield frame and a second portion extending in a generally vertical plane from said first portion to said second end removably attached to said rear support structure of said support frame;

a flexible and at least partially transparent cover panel overlaying said frame members, said cover panel including a top section covering said first portion of said frame members, a rear section covering said second portion of said frame members and a pair of side sections extending downwardly from said top section along opposing sides of said pair of frame members, said side sections including a forward edge removably secured to said wind guard between said respective side rear view mirror and said handle bar whereby said side sections of said cover panel are spaced inwardly from said side mirrors to prevent interference of said cover panel with the rear and side views of the motorcycle.

2. A removable cover assembly as set forth in claim 1 wherein said frame members include a plurality of elongated tubular sections having a connector at each opposing end for removable attachment to another of said tubular sections.

3. A removable cover assembly as set forth in claim 2 further including a cross frame comprising a plurality of tubular sections extending transverse to said longitudinal frame members for interconnecting said pair of frame members in spaced apart parallel relation.

4. A removable cover assembly as set forth in claim 3 wherein said first portion of said frame members extends from said windshield frame to said cross frame and said second portion of said frame members extends downwardly from said cross frame to said second end adjacent said rear structure of said motorcycle.

5. A removable cover assembly as set forth in claim 4 further including a center frame member extending longitudinally parallel between said pair of frame members from said windshield frame to said cross frame, said center frame member including a plurality of tubular sections for attachment therebetween.

6. A removable cover assembly as set forth in claim 5 wherein said windshield frame includes a U-shaped support plate for attachment to said windshield of said motorcycle and a corresponding U-shaped cover tube fixedly secured in overlapping relation to said support plate for receiving said front edge of said cover panel.

7. A removable cover assembly as set forth in claim 6 further including a spacing bar fixedly secured to each opposing side of said wind guard structure and extending rearwardly and outwardly therefrom for spacing said side cover panels away from said handle bars.

8. A removable cover assembly as set forth in claim 7 further including a storage compartment mounted to said rear structure of said support frame including a plurality of storage openings divided by compartment walls for individually storing each of said tubular section of said frame members, said cross frame, said center frame and said cover panel and prevent contact therebetween.

* * * * *